United States Patent [19]
Simpson

[11] 3,815,641
[45] June 11, 1974

[54] CONCRETE PIPE WITH SPLAYED SOCKET

[75] Inventor: Charles William Simpson, Surrey Hills, Australia

[73] Assignee: Rocla Concrete Pipes Limited, Melbourne, Victoria, Australia

[22] Filed: July 6, 1972

[21] Appl. No.: 269,422

[30] Foreign Application Priority Data
July 6, 1971 Australia............................ 5437/71

[52] U.S. Cl.................................. 138/155, 285/230
[51] Int. Cl.............................................. F16l 17/02
[58] Field of Search ............ 138/177; 285/344, 335, 285/237, 230, 231, ; 138/155, 109, 176

[56] References Cited
UNITED STATES PATENTS
1,873,590  8/1932  James............................ 285/231 X
2,108,848  2/1938  Engel et al......................... 285/231
2,264,815  12/1941  Thomson....................... 285/344 X FOREIGN PATENTS OR APPLICATIONS
923,130  4/1963  Great Britain..................... 285/344

Primary Examiner—Jerry W. Myracle
Attorney, Agent, or Firm—Cushman, Darby & Cushman

[57] ABSTRACT

A concrete pipe for laying in bend of a pipe line. The pipe is of straight cylindrical, spigot and socket type. The socket is deliberately splayed so that socket axis is inclined at acute angle to longitudinal pipe axis to enable strong joint between successive pipes laid at angle to one another.

4 Claims, 2 Drawing Figures

CONCRETE PIPE WITH SPLAYED SOCKET

BACKGROUND OF THE INVENTION

1. Field of the Invention

This invention relates to pipes and has particular but not exclusive application to concrete pipes.

2. Description of Prior Art

Concrete pipes are used extensively for water supply, drainage and sewage purposes. They are often connected together end to end into a pipeline by spigot and socket joints with rubber-ring seals. Each length of pipe is formed with a spigot end and a socket end and the spigot end of one pipe is inserted into the socket of the adjacent pipe. A rubber ring is disposed between the spigot and socket at each joint and the joint is finally sealed with mortar.

When a pipeline must negotiate a bend the respective lengths of pipe are simply laid at a slight angle to one another to the extent permitted by the clearance of slope of the socket joints. However, the sharpness of bend which can be achieved by this technique is severely limited and moreover the respective pipe joints are suspect. The spigots and sockets can easily be damaged when the pipes are being fitted together in a deliberately misaligned condition. Furthermore, the joints are in a slightly opened condition to the outside of the bend, and since the spigots are not firmly located in the sockets, the rubber ring can tend to blow out. Thus the joint seals may not be fully effective to stop leaks.

SUMMARY OF THE INVENTION

The present invention provides a simple, but effective solution to the above problem by providing a special type of spigot and socket pipe in which the socket is deliberately splayed to enable the formation of a strong joint between successive pipe lengths laid at angle to one another.

According to the invention there is provided a straight cylindrical pipe having a spigot end and a socket end to receive the spigot end of an adjacent similar pipe, wherein the socket of the socket end of the pipe is disposed about a socket axis which is inclined at an acute angle to the longitudinal axis of the pipe.

Said acute angle may be less than 12°. More particularly this angle may be in the range 4° to 8°.

Preferably, the end face of the socket end of the pipe is perpendicular to the socket axis and therefore inclined to the axis of the pipe by an angle complementary to the first said angle.

BRIEF DESCRIPTION OF THE DRAWINGS

In order that the invention may be more fully explained, one particular embodiment will now be described in detail with reference to the accompanying drawing, in which.

Figure 1:
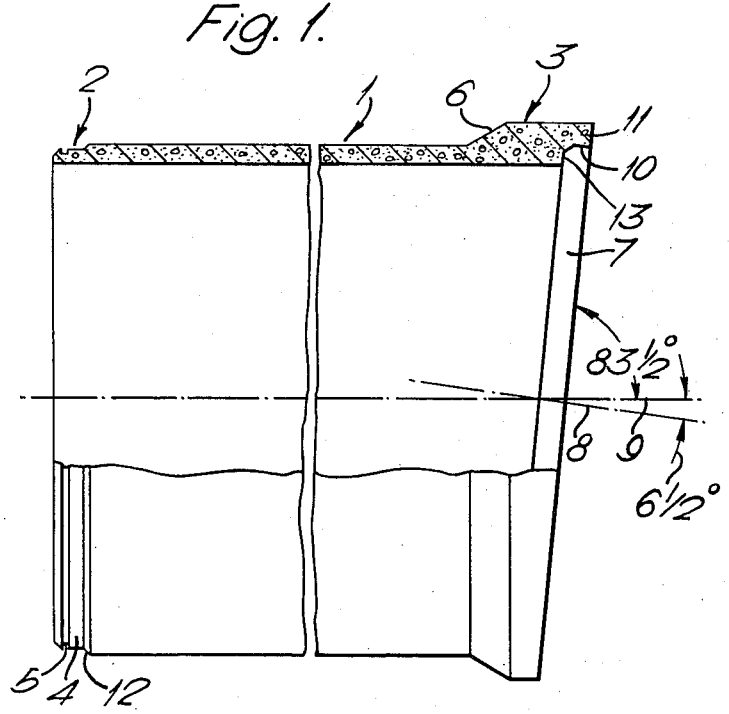
FIG. 1 is a broken and partly sectioned elevation of a pipe constructed in accordance with the invention.

The illustrated pipe 1 is a straight cylindrical pipe having a spigot end 2 and a socket end 3. The spigot end of the pipe is entirely conventional having a spigot 4 of reduced diameter which meets the main part of the pipe at a shoulder 12. The spigot has an annular groove 5 to receive a resilient jointing ring.

The socket end 3 of the pipe is of slightly increased outside diameter compared with the main part of the pipe and meets the main part of the pipe at a tapered shoulder 6. The socket end defines a cylindrical socket 7, the internal diameter of which is slightly greater than the external diameter of the spigot 4. Thus the socket 7 is adapted to receive the spigot of an adjacent similar pipe to which a jointing ring has been fitted.

The cylindrical wall 10 of socket 7 is formed about a socket axis 8 which is inclined at an angle of 6½° to the longitudinal axis 9 of the pipe itself. The end face 11 of the socket end 3 is perpendicular to the socket wall 10 and axis 8 and is therefore inclined at an angle of 83½° to the longitudinal axis of the pipe. Similarly, the annular floor 13 of the socket is perpendicular to the socket axis and is parallel with the end face 11.

Figure 2:
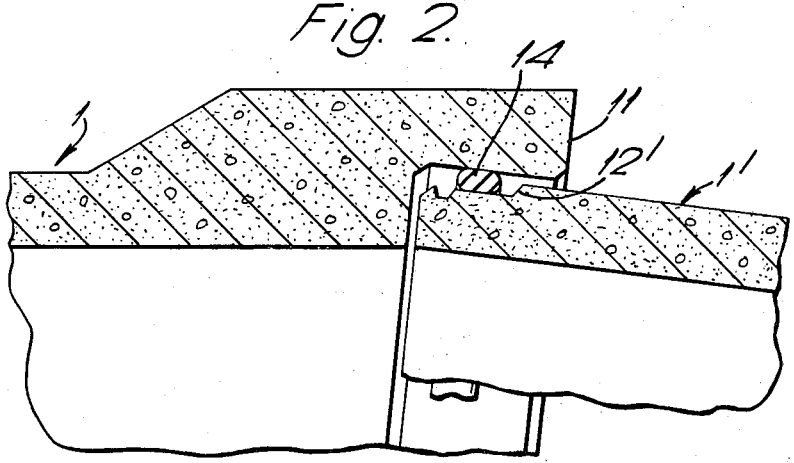
FIG. 2 is an enlarged cross-section through a joint formed between two pipes of the type shown in FIG. 1.

FIG. 2 shows a joint formed between the socket end of the pipe 1 and the spigot end of an adjacent similar pipe 1'. The spigot 4' of pipe 1' is fitted with a jointing ring 14 and is firmly located in the socket of pipe 1. As the spigot is inserted into the socket the ring rolls from the groove 5 toward the shoulder 12' and in the finished joint it is in a compressed condition between the cylindrical peripheral surfaces of the socket and the spigot. When the spigot and socket are properly fitted together without strain or distortion the pipes will be inclined to one another by an angle of 6½°. By adding further similar pipes, it is possible to make substantial bends in a pipeline while maintaining strong and properly sealed joints. Such bends can be horizontal bends to negotiate changes of direction of the pipeline or they can be in a vertical plane to follow terrain.

The illustrated pipe has been advanced by way of example only and the invention is in now way limited to specific details of this construction. In particular the angle between the socket axis and the pipe axis may be varied to suit specific job requirements. It is to be understood that many variations will fall within the scope of the appended claims.

I claim:

1. A straight cylindrical concrete pipe having a main cylindrical part disposed about a longitudinal pipe axis, a spigot end and a socket end to receive the spigot end of an adjacent similar pipe, wherein the spigot end of the pipe is cylindrical and is disposed about the longitudinal pipe axis, the pipe wall is thickened at the socket end of the pipe and the socket is formed in the thickened part of the wall to have a straight cylindrical peripheral socket surface which is of slightly greater diameter than the spigot end of the pipe and is disposed about a socket axis inclined at an acute angle of at least 4° to the longitudinal axis of the pipe.

2. A concrete pipe as claimed in claim 1 wherein the socket end of the pipe has a cylindrical outer periphery disposed about the longitudinal axis of the pipe which periphery is of greater diameter than the outer periphery of the main part of the pipe and meets with the main periphery at an external shoulder and the end face of the socket end of the pipe and the floor of the socket are disposed in parallel planes which are perpendicular to the socket axis and are therefore inclined to the longitudinal axis of the pipe by an angle complementary to the said acute angle.

3. A pipe assembly comprising a pair of similar concrete pipes each having a main cylindrical part defining a longitudinal pipe axis, a cylindrical spigot end disposed about the longitudinal pipe axis, a socket end at which the pipe wall is thickened, a socket formed in the thickened part of the wall to have a straight cylindrical peripheral surface which is of slightly greater diameter than the spigot end of the pipe and is disposed about a socket axis inclined at an acute angle of at least 4° to the longitudinal axis of the pipe; said pipes being arranged in end to end relation with their longitudinal axis meeting substantially at said acute angle and with the spigot end of one pipe located concentrically within the socket of the other pipe, said assembly further comprising a resilient jointing ring disposed between and compressed by the spigot end of said one pipe and the peripheral surface of the other pipe.

4. A pipe assembly as claimed in claim 3, wherein the socket end of said other pipe has a cylindrical outer periphery disposed about a longitudinal axis of the pipe which periphery is of greater diameter than the outer periphery of the main part of that pipe and meets that main part periphery at an external shoulder and the end face of the socket end of said other pipe and floor of the socket of that pipe are disposed in parallel planes which are perpendicular to the respective socket axis and therefore to the pipe and spigot axis of said one pipe.

* * * * *